United States Patent [19]
Ramanathan et al.

[11] Patent Number: 5,913,041
[45] Date of Patent: Jun. 15, 1999

[54] SYSTEM FOR DETERMINING DATA TRANSFER RATES IN ACCORDANCE WITH LOG INFORMATION RELATES TO HISTORY OF DATA TRANSFER ACTIVITIES THAT INDEPENDENTLY STORED IN CONTENT SERVERS

[75] Inventors: Srinivas Ramanathan, Sunnyvale; Tai Jin, San Mateo; Manjari Asawa, Mountain View, all of Calif.

[73] Assignee: Hewlett-Packard Company, Palo Alto, Calif.

[21] Appl. No.: 08/762,355

[22] Filed: Dec. 9, 1996

[51] Int. Cl.$^6$ .................................................. G06F 13/00
[52] U.S. Cl. .............................. 395/200.63; 395/200.64; 395/200.65
[58] Field of Search ................................ 395/180, 200.54, 395/200.63, 200.64, 200.65; 371/20.1; 370/241

[56] References Cited

U.S. PATENT DOCUMENTS

| | | | |
|---|---|---|---|
| 5,197,127 | 3/1993 | Waclawsky et al. | 395/200.54 |
| 5,365,514 | 11/1994 | Hershey et al. | 370/214 |
| 5,377,196 | 12/1994 | Godlew et al. | 371/20.1 |
| 5,446,874 | 8/1995 | Waclawsky et al. | 395/180 |
| 5,521,907 | 5/1996 | Ennis, Jr. et al. | 370/17 |

OTHER PUBLICATIONS

Anacapa Software Press Release, "NetScore Intelligent Agent Tracks Users Response Time to Intranet/Internet Servers, File Servers, IP Hosts and SNA Mainframes," May 28, 1996.

Hewlett–Packard Company, Information Networks Division, "Netperf: A Network Performance Benchmark," Revision 2.1, Feb. 15, 1996.

Mathis, Matt and Mahdavi, Jamshid, "Diagnosing Internet Congestion with a Transport Layer Performance Tool."

*Primary Examiner*—Le Hien Luu

[57] ABSTRACT

A method and system of monitoring throughput of a data access system includes logging each transfer of data from a content server to a remote site, with each log entry including information indicative of transfer size, date, times, source and destination. The method includes accessing the log information in a passive and non-intrusive manner to evaluate the performance of transfers to a selected subset of the remote sites. In another embodiment, the performance evaluation is implemented for system resource allocation planning. In the preferred embodiment, the data access system is a broadband data system and the content servers utilize Internet applications. Also in the preferred embodiment, the data throughput is measured by the transfer rate of useful data, rather than all data including retransmissions.

19 Claims, 6 Drawing Sheets

| Transfer Size (Bytes) | Throughput measurement at server (in Mbps) with transfer time being measured from the request receipt time to the time of the last socket write. | Throughput measurement at server (Mbps) with response time being measured from request receipt time to socket close time. | Throughput observed by subscriber (Mbps) |
|---|---|---|---|
| 500 | 30.68 | 3.49 | 3.42 |
| 1000 | 47.66 | 5.16 | 5.87 |
| 10000 | 16.42 | 8.49 | 8.55 |
| 20000 | 12.70 | 8.74 | 8.90 |
| 50000 | 10.37 | 8.98 | 9.01 |
| 70000 | 9.91 | 8.99 | 9.03 |
| 100000 | 9.52 | 8.99 | 9.05 |
| 500000 | 9.15 | 8.99 | 9.07 |
| 1000000 | 9.12 | 9.08 | 9.09 |
| 5000000 | 9.08 | 9.10 | 9.09 |

SYSTEM FOR DETERMINING DATA TRANSFER RATES IN ACCORDANCE WITH LOG INFORMATION RELATES TO HISTORY OF DATA TRANSFER ACTIVITIES THAT INDEPENDENTLY STORED IN CONTENT SERVERS

TECHNICAL FIELD

The invention relates generally to managing a data access system, and more particularly to monitoring throughput during data transfers between a server system and remote sites over a communication network.

BACKGROUND ART

Efficient transfers of data between a central server system and remote sites require a high bandwidth capability. At one time, a 14.4 kbps connection was believed to provide sufficient bandwidth for most users connected to a server system. However, adding graphics, video and/or audio files to text files certainly taxes the capability of such a connection. Moreover, the popularity of Internet applications, such as the World Wide Web, has threatened to overload the capacity of existing communication lines.

Industries such as the cable and telephone industries have introduced technologies and equipment to address bandwidth concerns. Cable operators and telephone carriers offer broadband data services via local access networks (e.g., ADSL, ISDN, Cable and wireless LMDS) to residential subscribers in order to provide the subscribers with direct, high-speed access to a variety of local community content, such as bulletin boards, news, and advertisements. In addition, the local access networks provide the residential subscribers with availability to commercial on-line service providers and the global Internet. Integrated Services Digital Network (ISDN) connections reach transfer speeds of 128 kbps and cable modems reach speeds of 10 Mbps.

A data access system is comprised of a server system and a high speed network that connects the server system to subscriber premises. The server system may be located within the premises of a cable operator or located at the central office of a telephone carrier. The server system includes content servers that store data for transfer to remote sites, such as the residences, schools, or offices of subscribers. In an Internet environment, the content servers typically utilize Internet applications, such as electronic mail, bulletin boards, news groups, and World Wide Web access. In addition to on-premises servers, a data access system may control access to remote servers. For example, a server system may have a Proxy server that allows a network administrator to restrict access to the Internet. Another use of a Proxy server is to cache frequently accessed data from the Internet.

Other components that are typical of server systems are a firewall that controls access to and from the system, a switching device for routing transmissions to and from subscribers, and a gateway device that routes packets to and from the global Internet and commercial on-line service providers.

Subscribers perceive performance of a data access system in various ways. Data transfer throughput is one of the predominant measures of performance as perceived by a subscriber. Data throughput is the rate at which data is transferred between the server system and a remote PC of a subscriber. As an example, when a subscriber initiates a file transfer using the File Transfer Protocol (FTP), data throughput is the ratio of the bytes transferred by the FTP (including any FTP header overheads) to the total time taken for the file transfer.

Since throughput provides an assessment of subscriber satisfaction, throughput monitoring is of interest to data service operators. In conventional local area data networks, several tools have been developed for monitoring data transfer throughput. Typically, the tools assess achievable throughput by simulating traffic on the network. There are at least two known types of active throughput testing tools. A first type of active throughput testing emulates data transfers over the TCP/IP protocols and can be executed from the server to measure downloading rates and/or from the premises of a subscriber to measure uploading rates. Tools of this type include Netperf, throughput TCP, and Traceroute Reno (treno). The second type of active throughput testing tool emulates typical user accesses to measure throughput to selected Web servers. Such a tool is described in a May 28, 1996 press release by Anacapa Software entitled "NetScore Intelligent Agent Tracks Users Response Time to Intranet/Internet Servers, File Servers, IP Hosts and SNA Mainframes."

In order to determine throughput on a site-by-site basis, the simulated traffic must be sent to or received from each subscriber site. Thus, the overhead of traffic generation grows proportionally with the number of subscriber sites that must be monitored. Perhaps more importantly, during high network loads the additional traffic imposed on the network for active monitoring can drastically reduce throughput to and from subscriber sites and can result in inaccuracies in the throughput measurements. Another concern is that these monitoring approaches require support for special applications at the servers and/or subscriber sites, solely for the purpose of monitoring throughput.

A round-trip delay measurement approach that is referred to as "non-intrusive" is described in U.S. Pat. No. 5,521,907 to Ennis, Jr. et al. Separate probes are positioned at selected monitoring points along a communication network. The probes receive identifiable data patterns normally transmitted over the communications network and generate a time stamp when each of the identifiable data patterns arrives at or leaves the selected monitoring point. Each probe also generates a pattern-identifier that is based on the data in the pattern. The pattern identifier and the time stamp are stored as a pair in an internal buffer. After the internal buffers of the two probes exceed a predetermined amount of data, a processor receives the data from the buffers and matches the pattern-identifiers of the two buffers. The matches locate the departure and arrival time stamps of each pattern traveling between the two monitoring points. The processor then calculates an average of round-trip delay or travel times based on the departure and arrival time stamps of several patterns traveling in both directions between the probes.

While the Ennis, Jr. et al. approach operates well for its intended purpose, the method requires probes to be connected at each site to which monitoring is to be implemented. Thus, each remote site must include a probe and its circuitry if the approach is to enable site-by-site evaluation. Moreover, since the approach requires a processor to match the patterns and compare the time stamps, the patterns and time stamps of at least one of the probes must be transmitted to the processor. This requires that the communication lines be utilized for the transmission. Consequently, a portion of the limited resources of the communications network being monitored must be temporarily dedicated to the monitoring process. Importantly, the throughput achievable on the network cannot be estimated based upon round-trip times alone. Since the method of Ennis, Jr. et al. only considers specific packets and not all packets, and since this method does not take into account packet retransmissions and other characteristics of the transport protocol (e.g., timeout delays), the method cannot directly be used for throughput measurements which refer to the rate of useful data delivery.

What is needed is a method and system for transferring data from at least one content server (such as a World Wide Web server) to various remote sites, with the system and method being passive with respect to monitoring throughput and without requiring monitoring equipment at each remote site.

SUMMARY OF THE INVENTION

A method of managing a data access system includes logging each transfer of data between a content server and a remote site of a subscriber/user. Each log entry includes selected bits of information about the server access, including the data transfer size and transfer times (or duration). The data access system accesses the log information to non-intrusively evaluate the performance of transfers to a selected subset of the remote sites. Performance evaluation is based upon the calculation of data throughput to the subset, as calculated using the log information of transfer sizes and times. In an implementation of the invention to provide subscriber technical support, the subset of interest is often a single remote site.

The method and system may be used in various implementations, such as subscriber support, network maintenance and resource allocation planning. In the subscriber support implementation, throughput estimates can be determined in response to receiving a trouble report from a subscriber or group of subscribers. The estimates can then be used to determine if there is a difficulty and to localize or globalize any detected difficulties, and determine times when the problem exists. In the network maintenance implementation, the throughput may be monitored periodically or continuously to provide early detection of faults. In the resource allocation planning implementation, trends in the fluctuations of throughput may be used to determine the most efficient allocation of existing resources or to evidence the need to add resources.

An advantage of the invention is that by utilizing the log information of the content servers to calculate and monitor throughput, the monitoring approach does not affect the operation being monitored. That is, rather than an active monitoring scheme in which data transfers are generated or increased in overhead merely to determine the transfer rate of the transfers, the invention utilizes collected data relating to subscriber-requested data. Another advantage of the invention is that no additional subscriber-end probes or other equipment is required. Another advantage is that the passive throughput monitoring approach can run continuously. In comparison, the active throughput tools of many prior art approaches cannot be run continuously, since the tools consume useful network bandwidth for testing, and thereby reduce throughput to subscribers. Also, passive monitoring looks to actual subscriber workloads, rather than simulated workloads, as is typically the case for active monitoring.

BEST MODE FOR CARRYING OUT THE INVENTION

Figure 1:
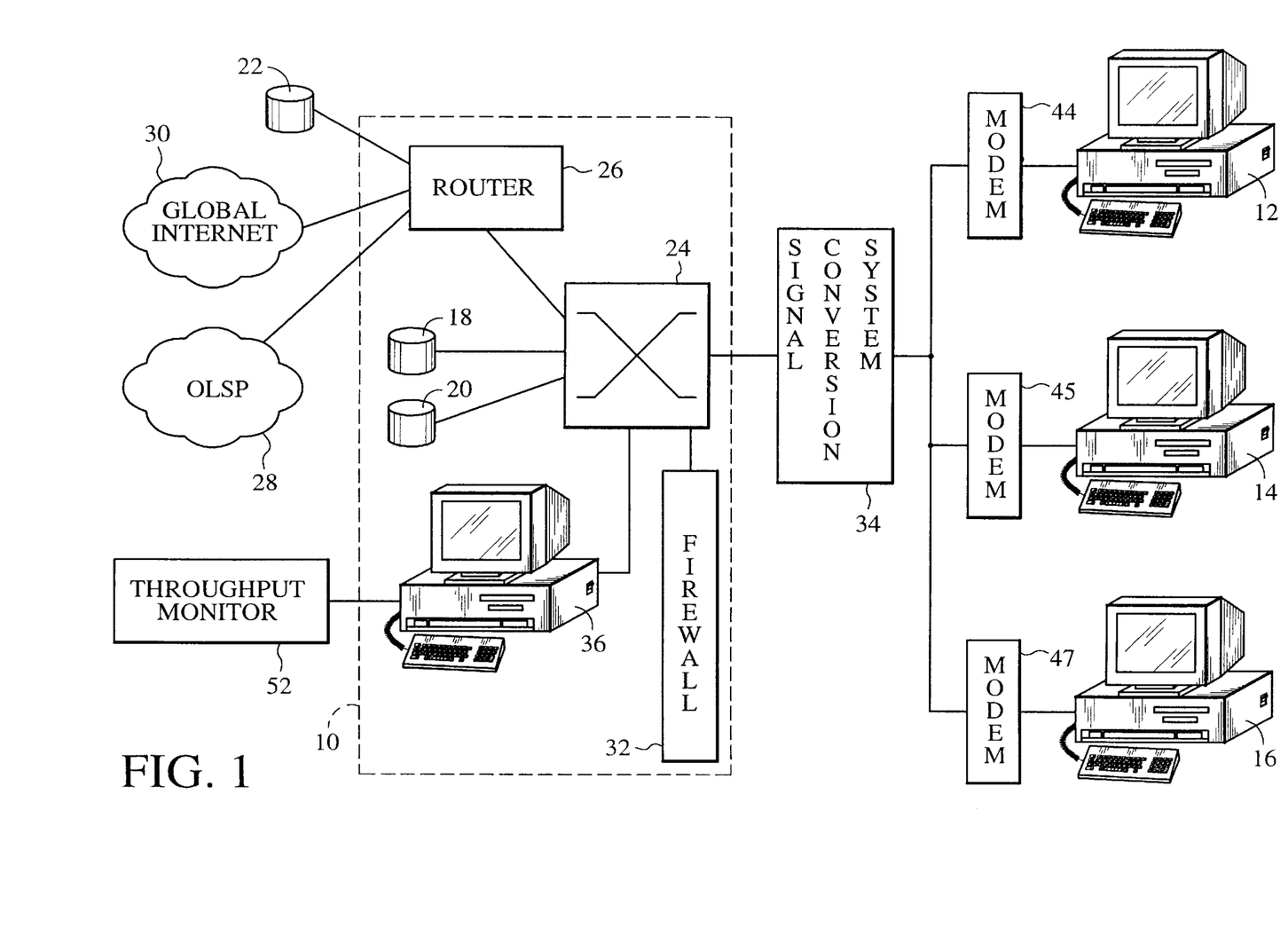
FIG. 1 is a schematical representation of a broadband data transfer network in accordance with the invention.

With reference to FIG. 1, a data access system includes a server system 10 for routing data to a number of remote sites 12, 14 and 16 upon receiving a request from a subscriber/user at one of the remote sites. The server system may be within the premises of a cable operator, or may be a central office of a telephone carrier, but this is not critical to the invention. The remote sites may be at the residences, schools, or offices of the subscribers/users.

The server system 10 is shown as having two content servers 18 and 20. In the preferred embodiment, the content servers support a variety of Internet applications, including World Wide Web access, electronic mail, bulletin boards, news groups and FTP access. In addition to the on-premises content servers 18 and 20, the complex controls a proxy server 22. Proxy servers are well known in the art. Such servers may be used to enhance security of accesses to and from the remote sites 12, 14 and 16, as well as to speed up Internet access by caching frequently accessed data locally.

The server system 10 also includes a switching device 24. While not critical, the switching device may operate in the Asynchronous Transfer Mode (ATM) to provide high bandwidth packet-based switching and multiplexing. The switching device 24 functions to connect the remote sites 12, 14 and 16 to the appropriate on-premises content servers 18 and 20 or to a router 26 which establishes communication with the proxy server 22 or other facility. In FIG. 1, the router 26 is connected to allow communication with a commercial on-line service provider 28 and with the global Internet 30. The switching device 24 and the router 26 are components well known in the art.

The server system 10 also includes a firewall 32 that controls access to and from the complex. Typically, firewalls are implemented in software and are included to enhance security of the network.

The server system is connected to one or more signal conversion systems 34 which route data to and from the remote sites 12, 14 and 16 via a metropolitan access network (MAN), not shown. Technologies for implementing MANs could include telephone lines, ISDN, ADSL, Cable or wireless LMDS. At the subscriber end, modems 44, 45 and 47 or adapters receive and transmit data over the MAN. For example, in a broadband application, internal broadband modems (e.g., cable modems for a cable network) transmit requests for data and receive data in accordance with known technology. The server system, the connectivity to the remote sites and any associated Proxy servers comprise the "data access system."

A final element of the server system 10 is a management system 36 that enables monitoring and control of the complex. As will be explained fully below, the management system may cooperate with an on-premises or off-premises throughput monitor 52 for calculating data throughput to the remote sites 12, 14 and 16. Throughput monitoring provides a means for evaluating the performance of the system and the performance of the connections to individual remote sites.

Figure 2:
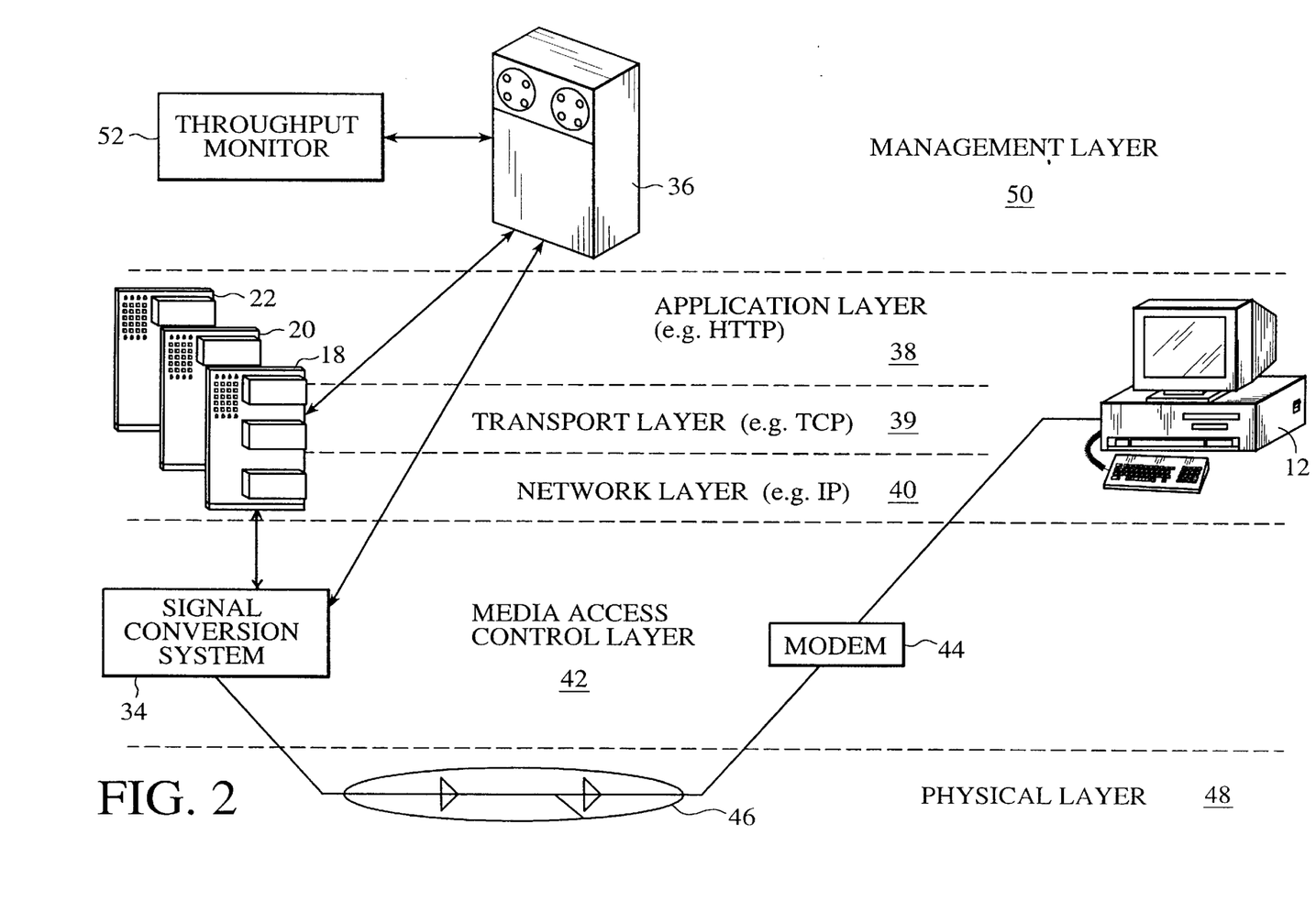
FIG. 2 is a schematical representation of the various layers utilized in the operation of the system of FIG. 1.

Referring now to FIGS. 1 and 2, the operation of the components of FIG. 1 requires a number of layers in order to seamlessly integrate the data access system with the Internet, thereby making the entire suite of Internet applications available to subscribers at the remote sites 12, 14 and 16. The on-premises content servers 18 and 20 and the proxy server 22 support the various Internet applications at an application layer 38. The applications rely on the Transmission Control Protocol (TCP) of a transport layer 39 to provide reliable transport. Using sophisticated acknowledgment and retransmission schemes, TCP recovers from packet losses that may occur during data transmission. The Internet Protocol (IP) is the network layer 40 protocol of choice for broadband data systems. IP operates above a media access layer 42 that is specific to the network technology used. Request signals from a remote site 12 to download data from one of the servers 18, 20 and 22 undergo conversion at a modem 44 or adapter prior to transmission via communication lines 46 of a physical layer 48. The request signals are again converted at the signal conversion system 34, as is well known in the art. In response to the request signals, Web pages, electronic mails, newsgroup articles and FTP files are downloaded to the remote site 12 via the reverse path of the request signals. The request and response may be transmitted over separate routes or via separate channels in the access network. While not critical, the communication lines 46 may be a hybrid fibercoaxial access network.

At the management layer 50 of FIG. 2, the management system 36 overlooks operation of the content servers 18, 20 and 22, the signal conversion system 34, and the media access control layer 42. A throughput monitor 52 is also located at the management layer. The throughput monitor may be an on-premises component, or may be remotely located from the server system 10, as shown in FIG. 1.

Data transfer throughput is the rate at which the system transfers data to and from the remote sites 12, 14 and 16. In the preferred embodiment, the throughput monitor 52 only considers the transfer of useful data. In this preferred embodiment, the measure of throughput must then occur above the transport layer 39, since monitoring the transport layer would take into account all retransmissions necessitated by downloads of corrupt packets. Still referring to the preferred embodiment, a measure of the throughput of useful data when a subscriber initiates a file transfer using FTP is the ratio of the bytes transferred by FTP (including the header overhead) to the total time taken for the file transfer. The throughput monitor 52 extracts this information from logs of server activity. The log information is initially and routinely stored at the different content servers 18, 20 and 22.

Conventional content servers 18, 20 and 22 include logging facilities. For example, if one of the content servers is a Web server, it may store the information in a format known as the Common Log Format (CLF). The use of a conventional format allows the throughput monitor 52 to conveniently interpret and process the log information. This log information preferably includes the start and end times (or durations of transfers), dates and transfer sizes for all data transfer activities. Moreover, the stored information includes the identification (address, host name, etc.) of the destinations of downloads. Preferably, the throughput monitor is able to determine the time at which each download or upload request is received from the destination site. Other information that preferably is contained within the logs includes the type of request, e.g., download (GET), upload (PUT), etc. In the case of a proxy server, the log entries preferably indicate whether the data is being retrieved from the local cache or whether it is being obtained from the Internet. As will be explained more fully below, such entries allow the throughput monitor 52 to distinguish the condition of the links of the data access system from the condition of links to the global Internet.

Each log entry preferably also includes a status code that indicates whether the data transfer was successful, was aborted, was redirected, or was handled in some other manner. In the case in which additional server processing is necessary to satisfy a particular request, the log should explicitly indicate the additional processing (e.g., an indication of the execution of CGI scripts at a Web server). The analysis process may choose to ignore any of the entries depending on the status code or server processing that is necessary. Log entries may also be filtered depending on the criteria of interest. For example, when diagnosing a download problem, only GET entries in the server logs must be considered.

Figure 3:
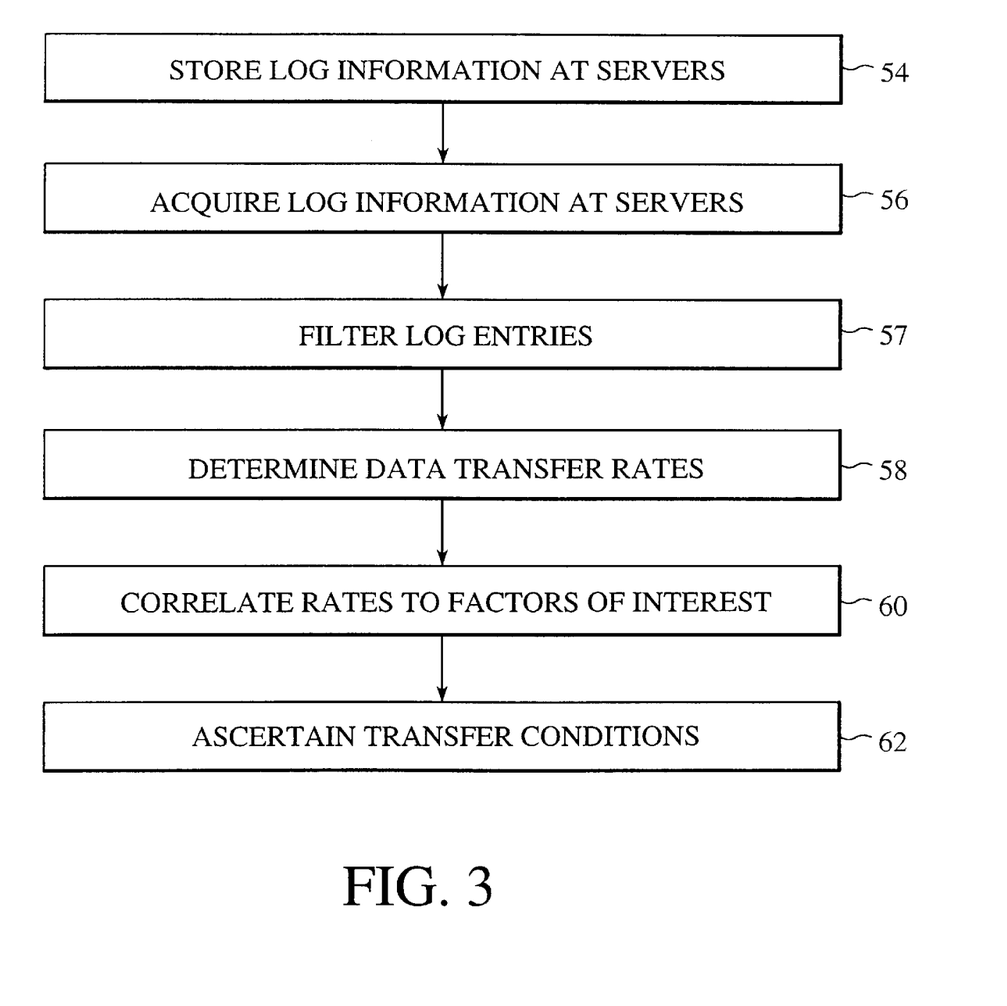
FIG. 3 is a process flow for operating the system of FIGS. 1 and 2.

The "passive" and "non-intrusive" monitoring approach of the invention utilizes the log information stored at the individual content servers 18, 20 and 22. Referring now to FIGS. 1–3, the step 54 of logging the transfer information is implemented in conventional techniques. Since most broadband data applications are connection-oriented, with elaborate handshaking between the two ends of a TCP connection for connection establishment and teardown, data transfer throughput as measured by the data access system using the log information is likely to be an accurate estimate of the throughput as experienced at the remote sites 12, 14 and 16. However, some filtering of information may be beneficial to optimizing the monitoring operation, as will be described below with reference to the table of FIG. 5. In the broadband data applications, the log information will identify the destinations as IP addresses or host names from which subscribers access the server system 10.

Web servers, proxy servers, FTP, E-mail, and News servers typically receive a large percentage of the subscriber accesses, and therefore are prime candidates for continuously logging subscriber accesses. Instrumentation of the servers to implement passive throughput monitoring is relatively straightforward. The throughput monitor 52 acquires the log information at step 56 of FIG. 3. While FIGS. 1 and 2 show the monitor 52 as being connected to the management system 36, this is not critical. The monitor may be connected directly to each of the on-premises content servers 18 and 20 and either indirectly or directly to the proxy server 22.

FIG. 3 also shows a step of filtering log entries 57. Some of the acquired log information from step 56 may be irrelevant to the throughput parameter of interest. For example, when the interest relates to the state of the MAN, log entries of the proxy servers that refer to accesses from the Internet must be filtered out, since these entries at least partially reflect the state of the links to the Internet. On the other hand, the state of the links to the Internet can be accessed using proxy server 22 log entries that indicate retrievals from the Internet. Filtering at step 57 may also be used to differentiate between upload requests and download requests, since different communication channels with different bandwidths and network characteristics may be used for uploads and downloads. Filtering allows the states of these channels to be determined independently.

In step 58, the filtered log information is used to calculate data transfer rates. Since throughput may vary depending upon data transfer sizes, the logged data is preferably preprocessed to smooth out variations in throughput values arising from transfer size differences. The round-trip time plays a larger role for smaller transfer sizes, so that the filtering that is executed at step 57 may include filtering out small-size transfers to discount such transfers. Again, this filtering will be described below with reference to FIG. 5.

Another concern is that different methods of computing transfer time at the content server level may introduce different degrees of inaccuracy for smaller data transfers. Throughput calculations may also be impacted by other network traffic (multiple simultaneous accesses to the servers or other portions of the server system 10), so that instantaneous throughput values obtained from server logs are preferably not directly used as a measure of system performance. Instead, statistical averaging techniques may be applied to the logged data to obtain reliable throughput values. The throughput values thus computed reflect not only the state of the network, but also the state of the servers. For example, a heavily loaded server may offer lower throughput than a lightly loaded server. Consequently, upon noticing a degradation of throughput values over time, a network management application should first attempt to obtain information relating to whether the throughput reduction is caused by excessive load on the servers.

Figure 6:
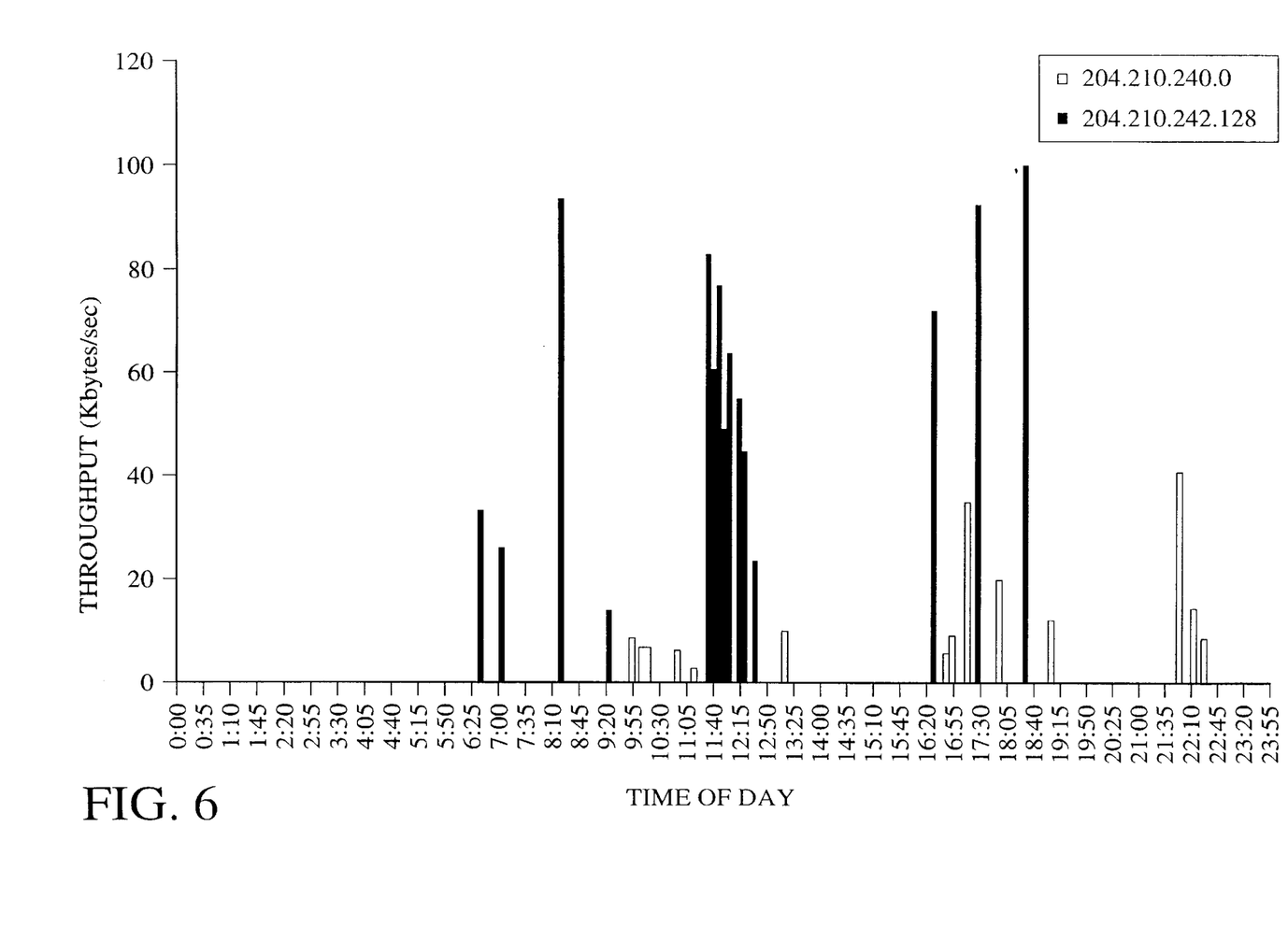
FIG. 6 is a bar graph comparison of data transfer through puts for two subnets, acquired using the method of FIG. 3.

In step 60, the data transfer rates are correlated with one or more factors of interest. For example, the factor of interest may be the throughput to a particular remote site 12, 14 or 16. Alternatively, the concern may be with the throughput to all of the subscribers in a particular geographical area, such as all homes connected to a specific fiber node in a cable network, or all homes in a specific IP subnet, or all homes accessing the system via a specific channel. FIG. 6 illustrates a correlation of throughput with the time of day in order to compare throughput for two subnets—204.210.240.0 and 204.210.242.128. Clearly, subnet 204.210.240.0 is experiencing a problem that is resulting in lower throughput. The factor of interest may also be time-related or date-related in order to determine whether the resources of the system are being taxed on particular days of the week or at particular times of the day. Based upon the correlation of rates with the factor or factors of interest, the step 62 of ascertaining transfer conditions is implemented. The implementation may take a variety of forms, including subscriber technical support, network maintenance and/or resource allocation planning.

In the subscriber technical support implementation of step 62, the throughput estimates at step 58 are obtained for the individual remote sites 12, 14 and 16. Estimates can also be obtained for the groups of subscribers that are located in the same neighborhood of the network or that use a specific set of network channels. Upon receiving a trouble report from a subscriber, a network operator can relatively easily determine whether the problem is being experienced by other subscribers or whether the problem is specific to the subscriber that initiated the report. Thus, a fault may be isolated to a single channel or a set of channels, or even to the connectivity to a single remote site, e.g., a problem with the subscriber's home wiring. The network operator may also observe throughput trends over time in order to surmise whether the fault is transient (e.g., a recent crack in a cable) or whether the fault has been persistent over a long time (e.g., a slow personal computer at the remote site). It is also possible to detect whether the fault is intermit-tent, as may be the case if radio frequency (RF) noise is generated by operation of equipment unrelated to the network during particular times of the day.

Figure 4A:
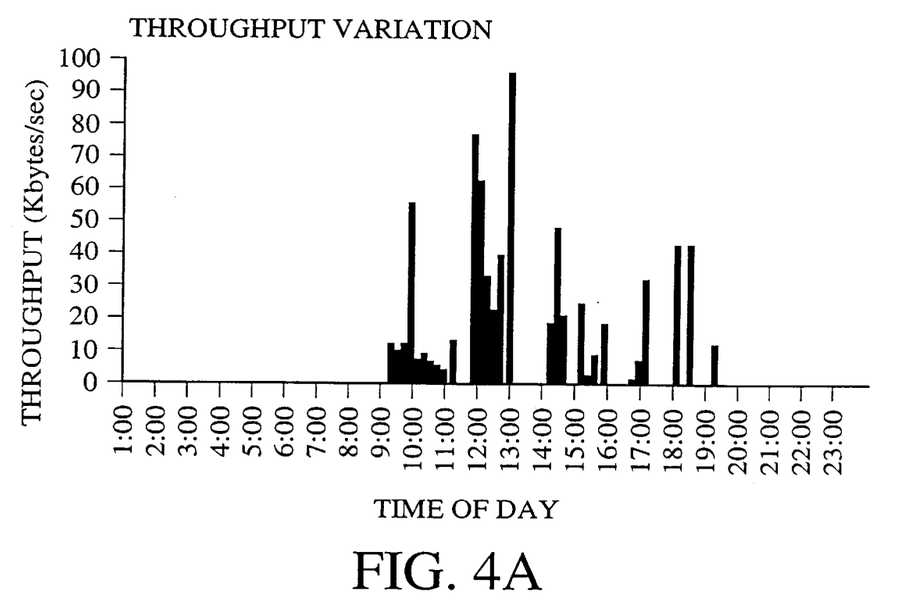
FIG. 4A shows the throughput variation of a network over a twenty-four hour period.
Figure 4B:
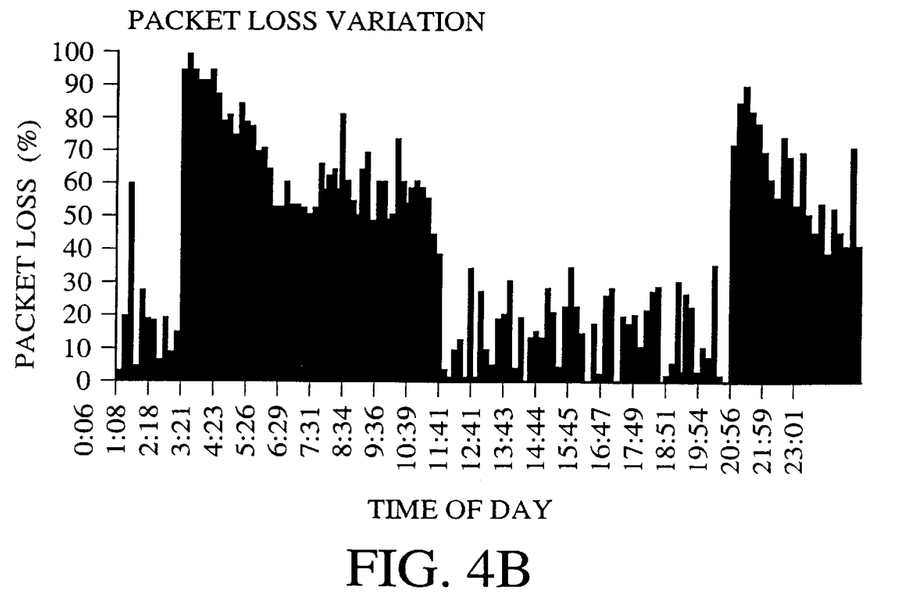
FIG. 4B shows packet loss variation for the network over the same twenty-four hour period shown in FIG. 4A.

In the network maintenance implementation of step 62, physical layer 48 impairments (e.g., RF impairments in a cable network) that induce bit errors during transmission may be detected at step 62 using the correlations of step 60. The bit errors will result in packet losses at the levels above the physical layer 48 in FIG. 2. Such packet losses will require retransmissions that slow the data transfer rate of useful data. A packet loss of 12% may result in a throughput reduction of almost 60%. FIGS. 4A and 4B illustrates the measured relationship between packet losses caused by physical layer impairments and throughput observed in a broadband data service trial over a hybrid fiber-coaxial (HFC) network. The packet loss values were obtained using an active loss-rate monitor that tested the network periodically by generating additional traffic. Throughput was monitored passively, and therefore the throughput values were available only during times when subscribers accessed the server complex. For the most part, during the period between 8:00 p.m. and 12:00 p.m., the packet loss was high and throughput was relatively low. In the period between 12:00 p.m. and 6:00 p.m., the packet loss decreased and there was a corresponding significant increase in measured throughput.

By monitoring trends in throughput values, network operators can obtain early indicators of network degradation, perform further diagnostics (e.g., run active loss-rate tests to assess whether the throughput reduction is caused by physical layer impairments), and schedule proactive maintenance without unduly disrupting service to subscribers and without the difficulty and expense of unscheduled, overtime repair. Since many RF impairments are time-dependent in their occurrence, throughput monitoring can provide indications of the exact time period when a problem manifests itself. These indications can be used to efficiently schedule network repairs proactively. In the example of FIGS. 4A and 4B, maintenance personnel should be dispatched either before 12:00 p.m. or after 9:00 p.m.

In the resource allocation planning implementation of step 62, throughput measuring is used to determine whether system resources should be reallocated or supplemented. A reduction in throughput occurs when the network interconnecting the server system 10 to the remote sites 12, 14 and 16 is congested. Throughput reduction is also inevitable when the server or servers 18, 20 and 22 are overloaded. By monitoring throughput drops and initiating further diagnosis, such as checking for packet drops at network routers, a network operator can ascertain conditions in which additional capacity is required to maintain a specific quality of service.

Returning to FIGS. 1 and 2, conventional Web servers, i.e. HTTP servers, log the data transfer size and the transfer time immediately after all of the data are written through the socket interface, rather than after the socket is closed. In practice, the socket writes only transfer data from the application to the socket buffer maintained in the kernel. The TCP protocol is then responsible for transmitting the data from the socket buffers to the requesting remote site 12, 14 and 16. Details of acknowledgments, packet losses, and retransmissions that are implemented by TCP are hidden from the application. As a result, the time interval between the receipt of the request and the last socket write only indicates the time to transfer all of the application data to the socket buffer. This does not measure the total time that elapses before the last byte of data actually reaches the remote site. In the extreme case, a socket buffer full of data, normally 8 KBytes, could still be awaiting transmission by TCP.

To obtain a more accurate transfer time measurement, the server application should measure the time interval from the receipt of the subscriber request to the time when the application closes the socket. The socket implementation guarantees that the socket buffer is empty when the socket close call succeeds. However, implementing this measurement in the HTTP server requires some changes to the structure of the existing code. The approach may be even more difficult in next-generation HTTP server implementations that are likely to use persistent connections from data transfers. In such implementations, a socket is not closed soon after a data transfer, but instead persists until a time-out period elapses following the transfer.

Figure 5:
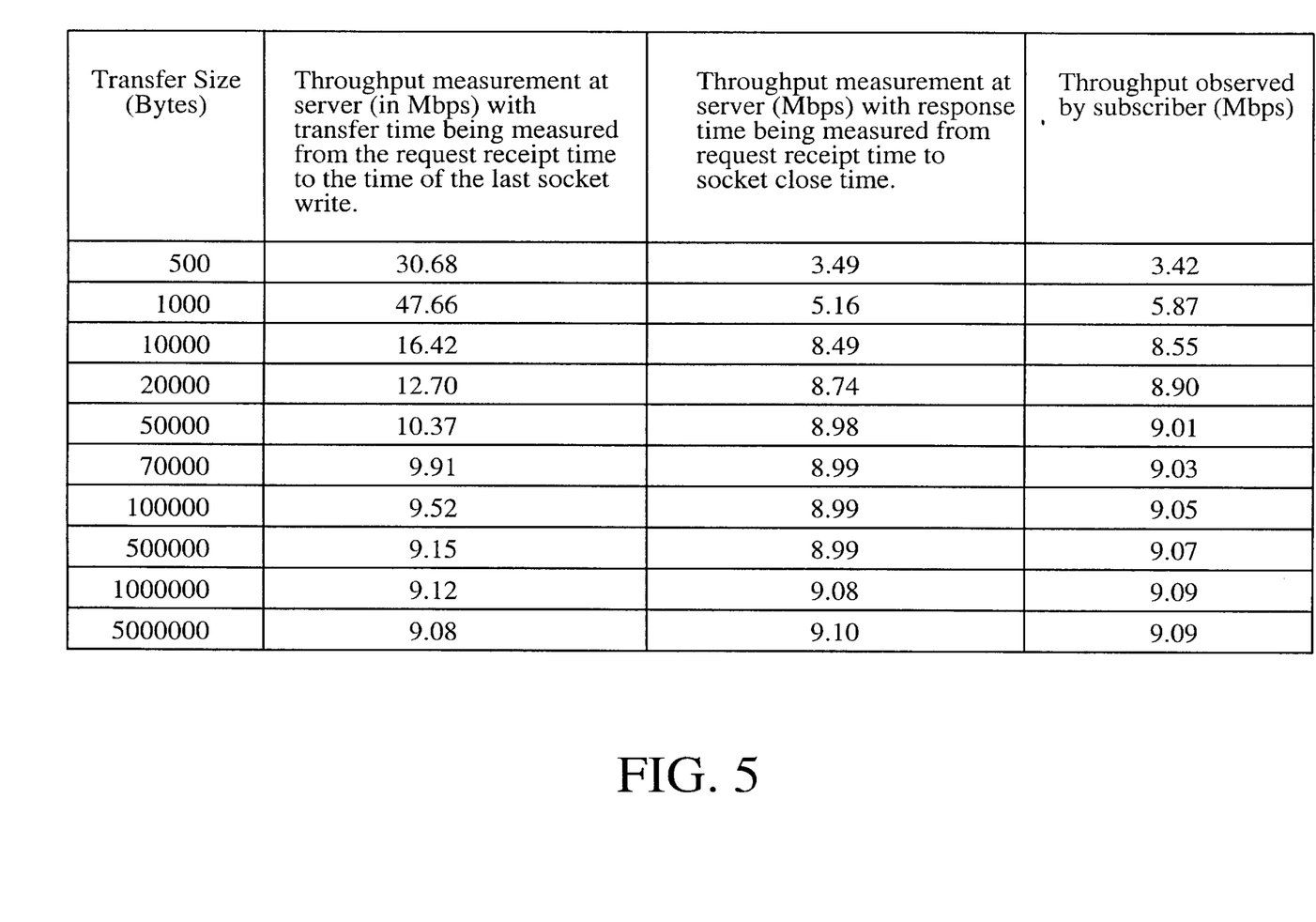
FIG. 5 is a table comparing three approaches to determining throughput, so that the benefits of filtering log information are better appreciated.

In order to estimate size-dependent inaccuracies in the least complex embodiment, the throughput estimates for three approaches to determining transfer time are compared. The results are shown in the table of FIG. 5. This table summarizes the results of experiments which were carried out in an isolated local area network. The table is not intended to show useful information for monitoring throughput, but compares the accuracies of measuring throughput by means of the different approaches. In the first approach that measures transfer time only until the last write, the results were highly inaccurate for the small transfer sizes of less than 70 KBytes. The inaccuracy is primarily attributable to the fact that this first approach does not measure the time to transfer the last 8 KBytes of data in the socket buffer, which constitutes a significant fraction of the actual transfer time measured at the transcriber end, as shown in the last column of the table. On the other hand, the larger the transfer size, the greater the accuracy of the throughput measurement of this first approach. The second approach is sufficiently accurate throughout the range of transfer sizes, but carries the above-identified difficulties in achieving its implementation. Regarding the third approach of observing throughput at the subscriber end, this approach is not cost efficient, since it requires that each remote station include software and/or hardware dedicated to the throughput measuring requirements.

To account for the size-dependent inaccuracies of the first approach of the table in FIG. 5, a filtering module may be added to discard all data transfers having a size below a preselected threshold. For example, in the testing used to acquire the data of FIG. 5, the threshold may be set at 70 KBytes. The filtering would also reduce the effect of content servers that disregard protocol overheads. Often HTTP servers disregard HTTP protocol overheads when log information is entered. It is estimated that a typical protocol header for image transfers is 173 bytes, and for HTML documents the overhead has a mean value of 132 bytes and a median of 180 bytes. For large transfer sizes, this HTTP protocol overhead is insignificant (less than 1%). Thus, the filtering module that passes only transfers exceeding 70 KBytes improves the accuracy of throughput measurements. The above represents an example of how a filtering module can be designed to account for inaccuracies in the passive monitoring process. The data transfer size threshold that determines whether a particular log entry is to be considered for further analysis should be based upon factors such as the networking technology in use, the bandwidths, the round-trip delays, and the socket buffer sizes in use.

The passive throughput monitoring approach of FIGS. 1, 2 and 3 has several advantages compared to active throughput monitoring approaches. Firstly, the passive throughput monitoring approach measures throughput without the need of any additional traffic generation. As a result, throughput values can be collected continuously during the operation of a broadband data system. In contrast, most active throughput tools cannot be run continuously, since these tools consume useful network bandwidth for testing, and therefore reduce throughput actually delivered to subscribers. Furthermore, the passive throughput monitoring approach measures throughput for actual subscriber traffic, rather than for predicted workloads. Another key advantage is that the passive throughput monitoring approach does not require special tools or applications to be invoked at the content servers 18, 20 and 22 or at the remote sites 12, 14 and 16 of the subscribers.

While the passive throughput monitoring approach holds advantages over active throughput monitoring, the active approaches may be used to isolate detected problems or may be used to enhance protective maintenance programs. During times in which the network and servers are under utilized, passive throughput monitoring cannot provide measurements of throughput achievable under the prevailing network conditions. Furthermore, since it does not require subscribers to be accessing the system in order to obtain a throughput measurement, the active approaches may be useful for a technician attempting to diagnose a particular problem.

We claim:

1. A method of managing a data access system for transferring data between a server system and a plurality of remote sites upon request from said remote sites comprising steps of:

forming log information for transfers of said data from a plurality of content servers associated with said server system, including determining transfer sizes and transfer times such that said determinations are non-intrusive with respect to said transfers, formation of said log information further including recording one of said remote sites as a receiving site for each of said transfers, said log information being formed independently for each of said content servers;

storing said log information at respective said content servers from which said data is transferred;

accessing said log information stored at each of said content servers; and enabling evaluation of performing said transfers from a combination of said content servers to a selected subset of said plurality of remote sites, including determining data throughput of said transfers to said subset based upon said log information, said determination of data throughput being indicative of rate of data transfer to said subset.

2. The method of claim 1 wherein said step of forming log information generates logs of transfers utilizing at least one Internet application.

3. The method of claim 2 wherein said step of forming log information includes logging an identification of the remote site for each of said transfers, said identification being indicative of said remote sites to which said transfers are directed.

4. The method of claim 1 wherein said step of forming log information includes recording time of data transfer starts and one of durations of transfers or time of data transfer ends as determined at said content server from which said transfer is initiated.

5. The method of claim 1 wherein said step that includes determining data throughput includes calculating the data transfer rate for a plurality of separate data transfers to a single remote site, said subset thereby being said single remote site.

6. The method of claim 1 further comprising a step of filtering out log information for particular transfers having a transfer size below a predetermined threshold size, said filtering being based upon criteria relating to determining data throughput for continuous data transfers to said subset.

7. The method of claim 1 further comprising a step of filtering out log information for particular transfers based upon status of said transfers, including whether said transfers were successful or aborted.

8. The method of claim 1 further comprising a step of filtering out log information for particular transfers based upon whether said transfers are from Proxy servers.

9. The method of claim 1 wherein said step of enabling evaluation of performing said transfers includes accessing said log information from a location remote from said server system and said plurality of content servers.

10. A method of managing a system for serving data to a plurality of remote sites comprising steps of:

acquiring stored information relating to a history of data transfer activities of at least one remotely located data server for which content is maintained independently from said system, including accessing each said data server to receive log information that is specific to data transfer dates, times and sizes and including identifications of a destination for each data transfer;

determining data transfer rates through said system based upon said acquired information;

correlating said data transfer rates of said activities with at least one of said data transfer dates, times and destinations; and utilizing said correlations as a basis for ascertaining conditions of said system during said data transfer activities.

11. The method of claim 10 wherein said step of correlating data transfer rates includes determining said data transfer rates for transfers to particular destinations.

12. The method of claim 10 wherein said step of acquiring information includes accessing logs accumulated at a plurality of servers, said servers including at least one of Hypertext Transfer Protocol (HTTP) servers, Proxy servers, File Transfer Protocol (FTP) servers, News servers, and E-mail servers, said system being an Internet Service Provider.

13. The method of claim 10 wherein said step of correlating data transfer rates includes filtering out transfers having a transfer size less than a predetermined threshold size, and includes selecting among correlating based upon location of said remote sites, upon communication channels in use, upon source of transferred data, and upon direction of data transfer.

14. The method of claim 10 wherein said step of acquiring information relating to data transfer size is specific to transfer of useful data.

15. The method of claim 10 further comprising a step of evaluating allocation of system resources based upon correlation of said data transfer rates of said activities with data transfer times and dates.

16. A data access system for providing access of data to a plurality of remote sites via communications lines comprising:

means for receiving requests for data from said remote sites;

means for non-intrusively routing requested data from a plurality of content servers to said remote sites from which said requests are received by said means for receiving;

means for accessing Log information stored by said content servers relating to transfer times and transfer sizes of said requested data routed by said means for routing; and rate determination means, connected to said means for accessing, for utilizing said log information in determining data transfer rates to particular remote sites.

17. The system of claim 16, wherein said content servers have a storage circuit that log start and end times or durations for transferring said requested data and log said transfer sizes and information indicative of whether said routed requested data is an upload or download, whether said routed requested data is from a Proxy server, and whether a content server executed processing of said routed requested data to satisfy a request from a remote site.

18. The system of claim 17, wherein said content servers include at least one of Hypertext Transfer Protocol (HTTP) servers and File Transfer Protocol (FTP) servers.

19. The system of claim 16, wherein said router further comprises a switching device compatible with Transmission Control Protocol/Internet Protocol (TCP/IP) transmissions.

* * * * *